May 2, 1944.  D. CURRIE  2,347,888
AUTOMOBILE JACK
Filed Jan. 16, 1942
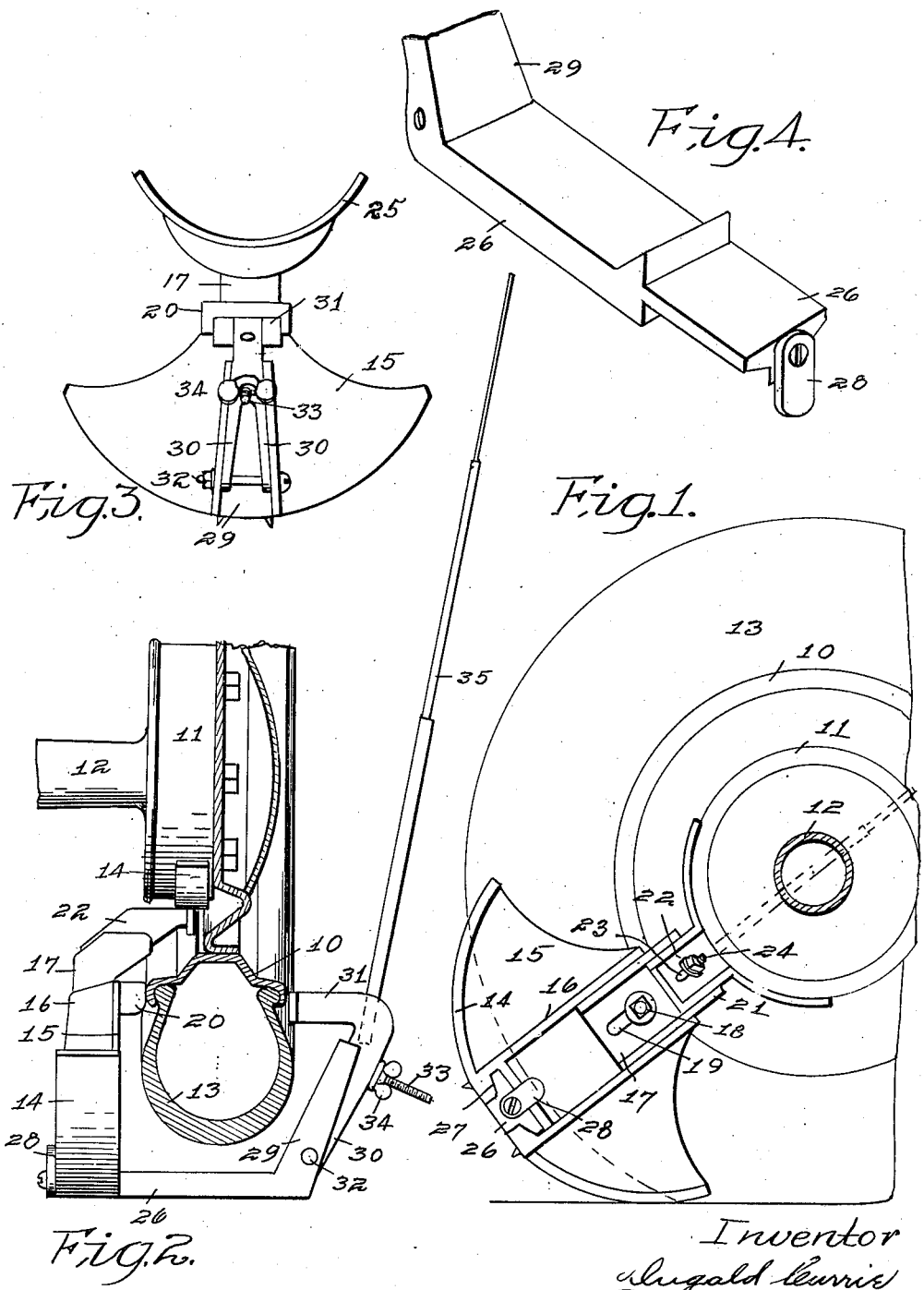
Inventor
Dugald Currie
by Orwig & Hague
attys Patented May 2, 1944

2,347,888

UNITED STATES PATENT OFFICE 2,347,888

AUTOMOBILE JACK

Dugald Currie, Des Moines, Iowa

Application January 16, 1942, Serial No. 427,035

3 Claims. (Cl. 254—94)

The object of my invention is to provide an automobile jack of simple, durable and inexpensive construction which may be placed in an inclined position with its base resting upon a roadway and its upper end engaging the brake drum of a wheel, and then upon a rotation of the wheel the jack will assume an upright position and raise the wheel.

More specifically, it is my object to provide a jack of this class which may be clamped to the rim of the wheel to be raised so that as the automobile is being moved to lift the wheel the jack will be securely held in proper position relative to the wheel, and further to provide means whereby as the tire begins its movement from the ground, it is held from rapid spinning movement which would tend to move the jack from its proper position.

In the accompanying drawing—

Figure 1 shows a side elevation of my improved jack in position engaging a wheel to be lifted;

Figure 2 shows a rear elevation of my improved jack and a sectional view of a part of a wheel in lifted position;

Figure 3 shows a side elevation of my improved jack taken from the side opposite from that shown in Figure 1; and Figure 4 shows a detail sectional view of the combined handle and rim-gripping member.

The part of the automobile shown comprises the rim 10, the brake drum 11, the axle 12, and the tire 13.

The jack comprises a rocker base 14 substantially semicircular as viewed from the side. At the inner side of the rocker base is an upright side member 15 having at its central portion two upright ribs 16 between which there is slidingly mounted an extension member 17 adjustably supported by a bolt 18 extended through a slot 19 and into the side member 15. At the upper end of the side member 15 is a rim-gripping jaw 20. The extension member 17 is formed with ribs 21, and mounted between these ribs is an arm 22 having a slot 23 to receive the bolt 24 for adjustably and detachably securing it to the extension member. At the upper end of the arm 22 is a segmental support 25 shaped to fit against the under surface of the brake drum 11.

The handle and rim-gripping member comprises a base 26 having one end shaped to be fitted into a groove 27 formed in the rocker member, as shown in Fig. 1. It is detachably held in the groove by a pivoted latch 28. Its under surface is in line with the under surface of the rocker 14, and both rest upon the ground when in position for use.

At the other end of the base 26 is an arm 29 extended upwardly and outwardly, and on its outer surface are two ribs 30. A rim-gripping jaw 31 is pivotally mounted on the bolt 32 extended through the ribs 30. A bolt 33 is extended through the arm 29 and the jaw 31, and a winged nut 34 is mounted on the bolt 33 for adjusting the jaw relative to the arm. A signal rod 35 is detachably mounted in an opening in the jaw member 31 to extend straight upwardly when the jack is in proper position for supporting the automobile wheel at its maximum elevation.

In practice the jack may be stored in a small space because the base 26 may be detached from the rocker member. When assembled, the jack is adjusted to properly fit the brake drum of the automobile. This is done by adjusting the extension member 17 for height and adjusting the arm 24 for moving the segmental support inwardly or outwardly to properly engage the brake drum. When said adjustments have been made it is not necessary to repeat such adjustments so long as the jack is being used for the same automobile. It is not necessary for the operator to reach to the inner side of the wheel, he simply grasps the handle 29, places the jack at the angle shown in Figure 1, and places it back of the wheel and moves it to position engaging the brake drum. He then moves the gripping jaw 31 to position engaging the wheel rim opposite the jaw 20 and tightens the nut 34. Then the automobile is moved by its own power to position with the jack upright. The signal rod 35 may be seen from the driver's seat of the automobile so that the automobile may be moved to and stopped at the right position.

One of the important advantages of my jack is that by firmly gripping the wheel rim between two jaws, the jack is securely held in proper position and the wheel is prevented from spinning. If operating on a driving wheel of an automobile, and at the instant when the tire leaves the ground and power is still being applied to the wheel, there is a tendency for the wheel to spin and throw the jack down. With my improvement, however, this is avoided in all cases. After the jack is in position supporting the brake drum, the jaw 31 may be released to permit the removal of the tire.

I claim as my invention:

1. An automobile jack, comprising a body adapted to be supported adjacent to the inner side of an automobile wheel to be serviced, having its upper end shaped to fit against the under surface of the brake drum of said wheel and a jaw adapted to engage the inner edge of the wheel rim, the bottom of the body having a flattened base portion adapted to rest on the ground surface, the front and back edges of the base portion terminating in oppositely arranged rockers, the radial distances from the center of a wheel supported on said body to the free end of said rockers being less than the distance from the center of said wheel to the bottom side of said base portion, said base portion including a laterally extending member to rest beneath said wheel, the outer end of said member terminating in an upwardly extended portion, a second rim-gripping jaw movably secured to said upwardly extended portion, and means carried by said upwardly extended portion for clamping the wheel rim between said first and second jaw members.

2. An automobile jack, comprising a body adapted to be supported adjacent to the inner side of an automobile wheel to be serviced, having its upper end shaped to fit against the under surface of the brake drum of said wheel and a jaw adapted to engage the inner edge of the wheel rim, the bottom of the body having a flattened base portion adapted to rest on the ground surface, the front and back edges of the base portion terminating in oppositely arranged rockers, the radial distances from the center of a wheel supported on said body to the free end of said rockers being less than the distance from the center of said wheel to the bottom side of said base portion, said base portion including a laterally and outwardly extending member to rest beneath said wheel, the outer end of said member terminating in an upwardly and outwardly inclined handle, a second rim-gripping jaw pivotally secured to the lower portion of said handle, means carried by said handle for clamping the second jaw member to the wheel rim and the rim to the first jaw member, means for detachably securing the outwardly extending portion of said base to said body, and means for detachably pivoting the second jaw to said handle.

3. An automobile jack, comprising a body adapted to be supported adjacent to the inner side of an automobile wheel to be serviced, having its upper end shaped to fit against the under surface of the brake drum of said wheel and a jaw adapted to engage the inner edge of the wheel rim, the bottom of the body having a flat base portion adapted to rest on the ground surface, the front and back edges of the base portion terminating in oppositely arranged rockers, the radial distances from the center of a wheel supported on said body to the free end of said rockers being less than the distance from the center of said wheel to the bottom side of said base portion, said base portion including a laterally and outwardly extending member to rest beneath said wheel, the outer end of said member terminating in an upwardly and outwardly inclined handle, a second rim-gripping jaw pivotally secured to the lower portion of said handle, means carried by said handle for clamping the second jaw member to the wheel rim and the rim to the first jaw member, and means carried on said second jaw for visually indicating when said base portion is flat against the ground.

DUGALD CURRIE.